(12) United States Patent
Hedman

(10) Patent No.: US 10,859,129 B2
(45) Date of Patent: Dec. 8, 2020

(54) METHOD FOR DISCONNECTING A VALVE UNIT FROM A PNEUMATICALLY CONTROLLED ACTUATOR ARRANGEMENT

(71) Applicant: VOLVO TRUCK CORPORATION, Gothenburg (SE)

(72) Inventor: Anders Hedman, Marstrand (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/489,831

(22) PCT Filed: Mar. 15, 2017

(86) PCT No.: PCT/EP2017/056067
§ 371 (c)(1),
(2) Date: Aug. 29, 2019

(87) PCT Pub. No.: WO2018/166588
PCT Pub. Date: Sep. 20, 2018

(65) Prior Publication Data
US 2020/0025265 A1 Jan. 23, 2020

(51) Int. Cl.
*F16H 61/30* (2006.01)
*F16D 48/06* (2006.01)

(52) U.S. Cl.
CPC ............ *F16D 48/06* (2013.01); *F16H 61/30* (2013.01); *F16D 2500/1028* (2013.01);
(Continued)

(58) Field of Classification Search
None
See application file for complete search history.

(56) References Cited

U.S. PATENT DOCUMENTS 5,411,448 A * 5/1995 Horii .................... B62M 9/12
477/102
2004/0195069 A1 10/2004 Bell et al.
(Continued)

FOREIGN PATENT DOCUMENTS

CN 101042188 A 9/2007
CN 101305230 A 11/2008
(Continued)

OTHER PUBLICATIONS

International Search Report and Written Opinion dated Nov. 29, 2017 in International Application No. PCT/EP2017/056067.
(Continued)

*Primary Examiner* — Justin Holmes
(74) *Attorney, Agent, or Firm* — Venable LLP; Jeffri A. Kaminski

(57) ABSTRACT

The present invention relates to a method for disconnecting a valve unit (302) from a pneumatically controlled actuator arrangement (208, 210) of a vehicle transmission (100), said transmission comprising at least one clutch arrangement (202, 204), a pneumatically controlled actuator arrangement (208, 210) arranged to controllably position the at least one clutch arrangement between a closed position and an opened position, and a valve unit (302) mechanically connected to the pneumatically controlled actuator arrangement (208, 210), the method comprising the steps of positioning (S1) the valve unit (302) in an opened state for providing compressed air to the pneumatically controlled actuator arrangement (208, 210); and subsequently disconnecting (S4) the valve unit (304) from the pneumatically controlled actuator arrangement (208, 210).

13 Claims, 6 Drawing Sheets

(52) U.S. Cl.
CPC ............... *F16D 2500/1045* (2013.01); *F16D 2500/10412* (2013.01); *F16D 2500/3024* (2013.01); *F16D 2500/5012* (2013.01)

(56) References Cited

U.S. PATENT DOCUMENTS

| | | | | |
|---|---|---|---|---|
| 2011/0168516 | A1* | 7/2011 | Takei | F16D 48/02 |
| | | | | 192/85.63 |
| 2016/0207746 | A1* | 7/2016 | Heil | F16D 48/06 |
| 2017/0368934 | A1* | 12/2017 | Edelen | F16H 48/08 |

FOREIGN PATENT DOCUMENTS

| | | |
|---|---|---|
| CN | 101490435 A | 7/2009 |
| CN | 101614254 A | 12/2009 |
| CN | 103671618 A | 3/2014 |
| CN | 104553778 A | 4/2015 |
| CN | 105240584 A | 1/2016 |
| CN | 105465231 A | 4/2016 |
| DE | 102005007463 A1 | 8/2006 |
| DE | 102006035134 A1 | 1/2008 |
| DE | 102007009542 A1 | 8/2008 |
| DE | 102010044153 A1 | 5/2012 |
| FR | 2585791 B1 | 2/1987 |
| JP | S61189328 A | 8/1986 |
| JP | 2017020601 A | 1/2017 |
| WO | 2006087098 A1 | 8/2006 |

OTHER PUBLICATIONS

International Preliminary Report on Patentability dated Jul. 12, 2019 in International Application No. PCT/EP2017/056067.
China Office Action dated Apr. 10, 2020 in corresponding Chinese Application No. 201780088240.3, 7 pages.

* cited by examiner

METHOD FOR DISCONNECTING A VALVE UNIT FROM A PNEUMATICALLY CONTROLLED ACTUATOR ARRANGEMENT

TECHNICAL FIELD

The present invention relates to a method for disconnecting a valve unit from a pneumatically controlled actuator arrangement of a vehicle transmission. The invention also relates to a control unit configured to control a pneumatically controlled actuator arrangement of a vehicle transmission, and a vehicle comprising such control unit. The invention is applicable on vehicles, in particularly low, medium and heavy duty vehicles commonly referred to as trucks. Although the invention will mainly be described in relation to a truck, it may also be applicable for other type of vehicles such as e.g. working machines or buses, etc.

BACKGROUND

In connection to controlling clutch arrangements such as clutches and brakes, in a vehicle, in particular in a transmission arrangement of a vehicle, pneumatic or hydraulic systems are often utilized for opening and closing the clutch arrangements. Hereby, high pressure of compressed air or high pressure hydraulic fluid is supplied to the clutch arrangement for opening and closing thereof, i.e. if the clutch arrangement is normally opened, the fluid is supplied for closing thereof, and if the clutch arrangement is normally closed, the fluid is supplied for opening thereof.

In order to control the flow of fluid to the clutch arrangement, a suitable valve arrangement is preferably provided. Hereby, the valve arrangement can be controlled to be opened or closed for controlling supply of fluid to the clutch arrangement.

In order to provide high precision control of the fluid flow to the clutch arrangement, the valve arrangement should preferably be positioned close to the clutch arrangement. Hereby, routing of fluid between the valve arrangement and the clutch arrangement is minimized as much as possible.

However, clutch arrangements of a transmission arrangement are often located in a relatively harsh and dusty environment. Hence, positioning the valve arrangement in the close vicinity of the clutch arrangement thus also exposes the valve arrangement to the harsh environment. Hereby, dust and particles may, for example, contaminate sealing surface between the valve arrangement and the clutch arrangement, especially when disconnecting the valve arrangement from the clutch arrangement during e.g. service and maintenance thereof.

A previous solution to the above defined problem is to position and enclose the valve arrangement in a cast pocket or the like such that it will be less affected by the harsh environment. However, such a solution is relatively complex and expensive, and can also negatively affect the strength of its surrounding transmission components. Hence, there are room for improvements in relation to sealing and prevention of dust particles from negatively affecting the arrangement for opening and closing the clutch arrangement.

SUMMARY

It is an object of the present invention to provide a method which at least partially overcomes the above described deficiencies. This is achieved by a method according to claim 1.

According to a first aspect of the present invention, there is provided a method for disconnecting a valve unit from a pneumatically controlled actuator arrangement of a vehicle transmission, the transmission comprising at least one clutch arrangement, a pneumatically controlled actuator arrangement arranged to controllably position the at least one clutch arrangement between a closed position and an opened position, and a valve unit mechanically connected to the pneumatically controlled actuator arrangement, wherein the method comprises the steps of positioning the valve unit in an opened state for providing compressed air to the pneumatically controlled actuator arrangement; and subsequently disconnecting the valve unit from the pneumatically controlled actuator arrangement.

The wording clutch arrangement should be understood to include both a clutch as well as a brake of the vehicle transmission. A clutch is a connecting mechanism that connects rotating parts to each other, while a brake is a locking mechanism or a braking mechanism that e.g. brakes the rotational speed of a shaft relative to a housing or the like of the transmission arrangement. Also, the clutch arrangement may be a normally closed clutch arrangement, which means that it is closed most of the times and opened when providing compressed air to the actuator. Hence, it is closed until actively providing compressed air for positioning it in an opened state. The clutch arrangement may also be a normally opened clutch arrangement, which means that it is opened most of the times and closed when providing compressed air to the actuator. Hence, it is opened until actively providing compressed air for positioning it in a closed state.

An advantage is that before disconnecting the valve unit from the actuator arrangement, a pressure is built up which will create an air flow in a direction out from the sealing surfaces between the valve unit and the actuator arrangement when disconnecting the valve unit. Hence, the air flow will prevent dust particles from entering the valve unit/actuator arrangement which will reduce the risk of contamination. Also, the increased pressure may assist when disconnecting the valve unit from the actuator arrangement by means of pushing the valve unit away from the actuator arrangement.

According to an example embodiment, the method may further comprise the steps of determining an air pressure level in the pneumatically controlled actuator arrangement; and comparing the air pressure level with a predetermined threshold limit.

The step of comparing the air pressure level with a predetermined threshold limit should not be limited to an active step of comparison. The step may equally as well be performed based on experience, i.e. the operator knows from experience how long time the valve should be positioned in the opened state until the air pressure level is above the predetermined threshold limit.

According to an example embodiment, the valve unit may be disconnected from the pneumatically controlled actuator arrangement when the air pressure level in the pneumatically controlled actuator arrangement exceeds the predetermined threshold limit.

According to an example embodiment, the valve unit and the pneumatically controlled actuator arrangement may be connected to each other at an actuator interface, wherein the air pressure level is determined at a position inside and in the vicinity of the actuator interface, and wherein the valve unit is disconnected from the pneumatically controlled actuator arrangement when the air pressure level in the vicinity of the actuator interface exceeds the predetermined threshold limit.

Hereby, it can be assured that air at compressed level will be directed out through the actuator interface where there otherwise is a risk that e.g. dust particles may enter when disconnecting the valve unit from the actuator arrangement.

According to an example embodiment, the valve unit may comprise an inlet valve for supply of compressed air to the pneumatically controlled actuator arrangement and an outlet valve for discharge of compressed air from the pneumatically controlled actuator arrangement, the method may further comprise the steps of positioning the valve unit in the opened state by positioning the inlet valve in an opened state; and positioning the outlet valve in a closed state. This will thus ensure that the air pressure level within the actuator arrangement will be increased when supplying compressed air thereto. The inlet valve and the outlet valve may be electronically controlled valves which are connected to a control unit or the like of the vehicle or the transmission.

According to an example embodiment, the predetermined threshold limit may be a pressure level higher than the atmospheric gas pressure level. Hereby, it can be assured that the air will be directed out from the actuator arrangement to the vicinity thereof, and not the other way around. The pressure level may be set to a level which is substantially higher than the atmospheric gas pressure level for sufficiently blowing out particles from the vicinity of the actuator interface between the valve unit and the pneumatically controlled actuator arrangement. The atmospheric gas pressure level should be understood as the pressure level outside of the valve unit and the actuator arrangement.

According to an example embodiment, the pneumatically controlled actuator arrangement may comprise a compressed-air cylinder arranged to mechanically position the at least one clutch unit between the closed position and the opened position.

According to an example embodiment, the clutch unit may comprise a clutch positioned between a first and a second transmission shaft of the transmission.

According to an example embodiment, the clutch may be positioned in an opened state for disconnecting the first and second transmission shafts from each other when positioning the valve unit in the opened state. Accordingly, the clutch is arranged as a normally closed clutch. The opened state of the valve unit is thus a state when compressed air is delivered to the pneumatically controlled actuator arrangement.

According to an example embodiment, the first transmission shaft may be an output shaft of a prime mover and the second transmission shaft may be an input shaft of the transmission.

According to an example embodiment, the clutch unit may comprise a braking mechanism arranged between a transmission shaft and a housing of the transmission.

According to an example embodiment, the braking mechanism may be arranged in a closed state for connecting the transmission shaft to the housing of the transmission when positioning the valve unit in the opened state. Hence, the braking mechanism is arranged as a normally opened clutch arrangement.

According to a second aspect of the present invention, there is provided a control unit configured to control a pneumatically controlled actuator arrangement of a vehicle transmission before disconnecting a valve unit from the pneumatically controlled actuator, the transmission comprising at least one clutch arrangement, wherein the pneumatically controlled actuator arrangement is arranged to controllably position the at least one clutch arrangement between a closed position and an opened position, and wherein the valve unit is mechanically connected to the pneumatically controlled actuator arrangement, wherein the control unit is configured to control the valve unit to be positioned in an opened state for providing compressed air to the pneumatically controlled actuator arrangement; and subsequently determine that the valve unit can be disconnected from the pneumatically controlled actuator arrangement.

Effects and features of the second aspect are largely analogous to those described above in relation to the first aspect of the present invention.

According to a third aspect of the present invention, there is provided a vehicle comprising a prime mover, a vehicle transmission and a control unit as described above in relation to the second aspect. The prime mover may, for example, be an internal combustion engine, a gas turbine, or an electric motor, etc.

According to a fourth aspect of the present invention, there is provided a computer program comprising program code means for performing any of the steps described above in relation to the various example embodiments of the first aspect.

According to a fifth aspect of the present invention, there is provided a computer readable medium carrying a computer program comprising program means for performing any of the steps described above in relation to the various example embodiments of the first aspect.

Effects and features of the third, fourth and fifth aspects are largely analogous to those described above in relation to the first aspect of the present invention.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
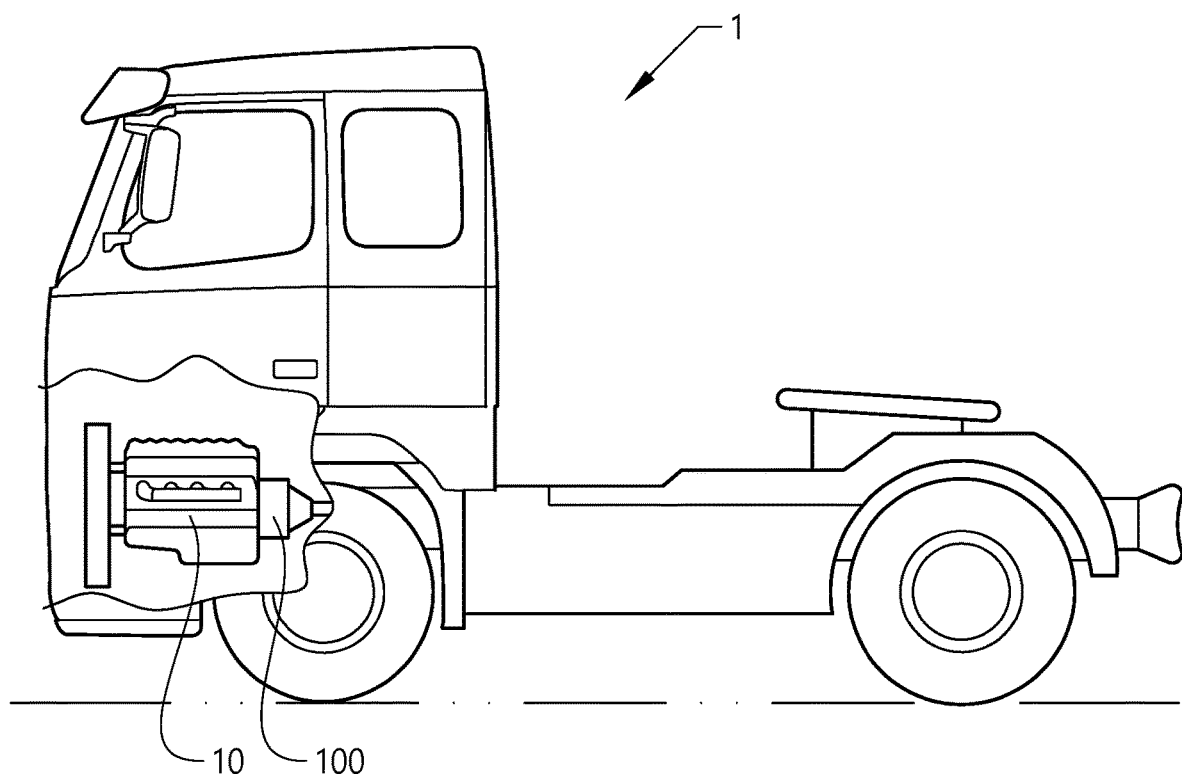
FIG. 1 is a lateral side view illustrating an example embodiment of a vehicle in the form of a truck.

The present invention will now be described more fully hereinafter with reference to the accompanying drawings, in which exemplary embodiments of the invention are shown.

The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 1 with a prime move 10 and a transmission 100 comprising a valve unit (302, FIG. 3) and a pneumatically controlled actuator arrangement (208 and 210, FIG. 2) according to the present invention. The vehicle 1 depicted in FIG. 1 is a truck for which the inventive transmission 100, as will be described further below, is particularly suitable for.

Figure 2:
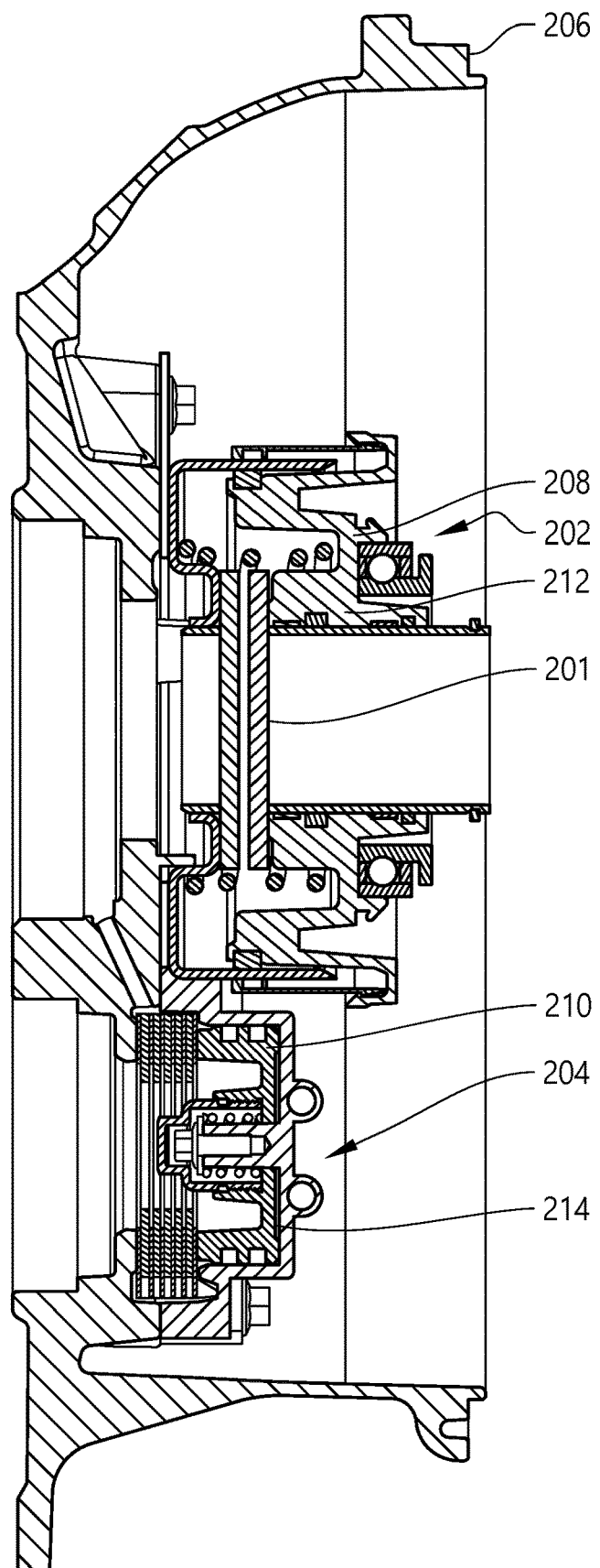
FIG. 2 is a cut-out side view illustrating clutch arrangements in the form of a clutch and a braking mechanism arranged within a clutch housing of a transmission according to an example embodiment.

Turning to FIG. 2, which is a cut-out side view illustrating clutch arrangements in the form of a clutch 202 and a braking mechanism 204. The clutch 202 comprises friction clutch elements 201. The braking mechanism 204 may also be referred to as a braking mechanism since its primary purpose is to reduce the rotational speed of a shaft. The clutch 202 and the braking mechanism 204 are arranged within a clutch housing 206 of the transmission 100, whereby the clutch 202 is arranged to controllably interconnect an output shaft (not shown) of the prime mover 10 to an input shaft (not shown) of the transmission 100. The braking arrangement 204 on the other hand is arranged to controllably brake a counter shaft (not shown) of the transmission 100 to the clutch housing 206. The counter shaft may also be referred to as a lay shaft.

Moreover, the transmission 100 also comprises a pneumatically controlled actuator arrangement for each of the clutch 202 and the braking arrangement 204. The pneumatically controlled actuator arrangement for the clutch 202 will in the following also be referred to as the clutch actuator arrangement 208, and the pneumatically controlled actuator arrangement for the braking mechanism 204 will in the following also be referred to as the braking actuator arrangement 210. The clutch 202 and the braking mechanism 204 further comprises a respective compressed-air cylinder 212, 214 which are each arranged to mechanically control the motion of the clutch 202 and the braking mechanism 204.

The clutch 202 is a normally closed clutch, i.e. it is continuously connecting the output shaft of the prime mover 10 to the input shaft of the transmission 100 until the clutch actuator arrangement 208 controllably positions it in an opened state. Hence, when providing compressed air to the clutch actuator arrangement 208, the clutch actuator arrangement 208 will eventually position the clutch 202 in an open position disconnecting the output shaft of the prime mover 10 from the input shaft of the transmission 100.

The braking arrangement 204 is a normally opened braking arrangement, i.e. it is disconnecting the counter shaft from the clutch housing 206 until the braking actuator arrangement 210 controllably positions the braking arrangement 204 in a closed position which brakes the rotational speed of the counter shaft relative to the clutch housing 206. Hence, when providing compressed air to the braking actuator arrangement 210, the braking actuator arrangement 210 positions the braking arrangement 204 in a closed state braking the counter shaft to the clutch housing 206.

Figure 3:
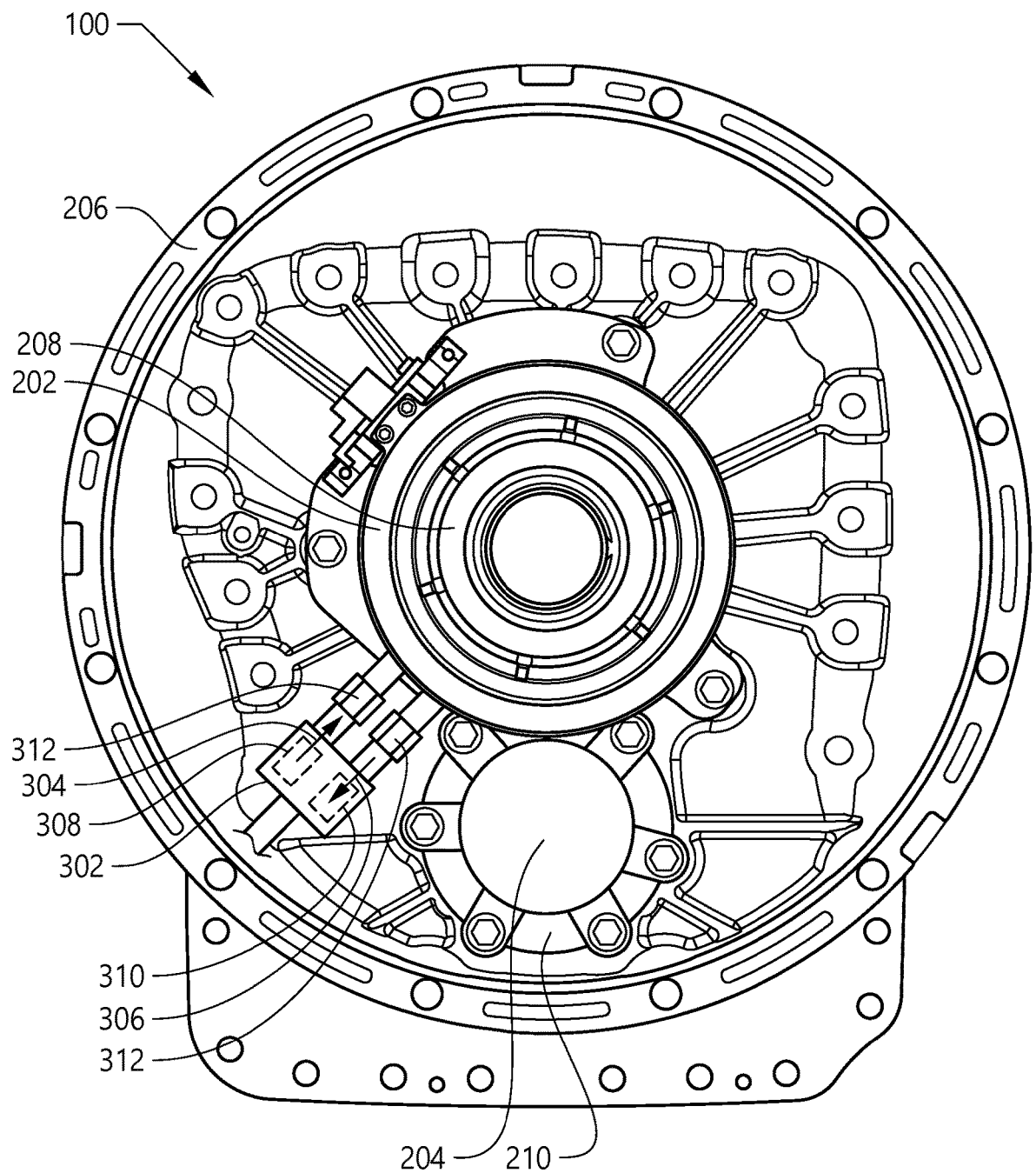
FIG. 3 illustrates a valve unit connected to a pneumatically controlled actuator arrangement according to an example embodiment.

Turning to FIG. 3, which is a view to the rear of the transmission 100. As can be seen, the clutch 202 and the braking arrangement 204 described above in relation to FIG. 2 are illustrated. According to the embodiment depicted in FIG. 3, a valve unit 302 is mechanically connected to the pneumatically controlled actuator arrangement 208 of the clutch, i.e. the clutch actuator arrangement 208. The valve unit 302 is arranged for controlling the flow of compressed air into and out from the clutch actuator arrangement 208. The valve unit 302 is thus arranged in fluid communication with a pneumatic tank or the like of the vehicle for supply of compressed air.

The flow of compressed air directed into the clutch actuator arrangement 208 is depicted with an arrow denoted as 304, while the flow of compressed air directed out from the clutch actuator arrangement 208 is depicted with an arrow denoted as 306. The valve unit 302 thus comprises an inlet valve 308 controlling the flow of compressed air into the clutch actuator arrangement 208, and an outlet valve 310 controlling the flow of compressed air out from the clutch actuator arrangement 208. In detail, when providing flow of compressed air into the clutch actuator arrangement 208, the inlet valve 308 is positioned in an opened state, and when exhausting air from the clutch actuator arrangement 208, the outlet valve 310 is positioned in an opened state. The valve unit 302 is preferably an electrically controlled valve unit 302 which is connected to a control unit of the transmission or vehicle for controlling the opening/closing of the inlet valve 308 and the outlet valve 310. The inlet valve 308 and the outlet valve 310 can of course also be one and the same valve which is arranged to direct a flow of compressed air into the actuator arrangement as well as out from the actuator arrangement.

Furthermore, the valve unit 302 and the clutch actuator arrangement 208 are connected to each other at an actuator interface 312. The actuator interface 312 is schematically illustrated for simplicity of understanding and it should thus be readily understood that the actuator interface 312 comprises sealing surfaces for proper sealing against the ambient environment within the clutch housing 206. The actuator interface 312 may comprise a suitable connecting means for connecting the valve unit 302 to the clutch actuator arrangement 208, such as e.g. bolt joint, a screw joint, etc.

Figure 4:
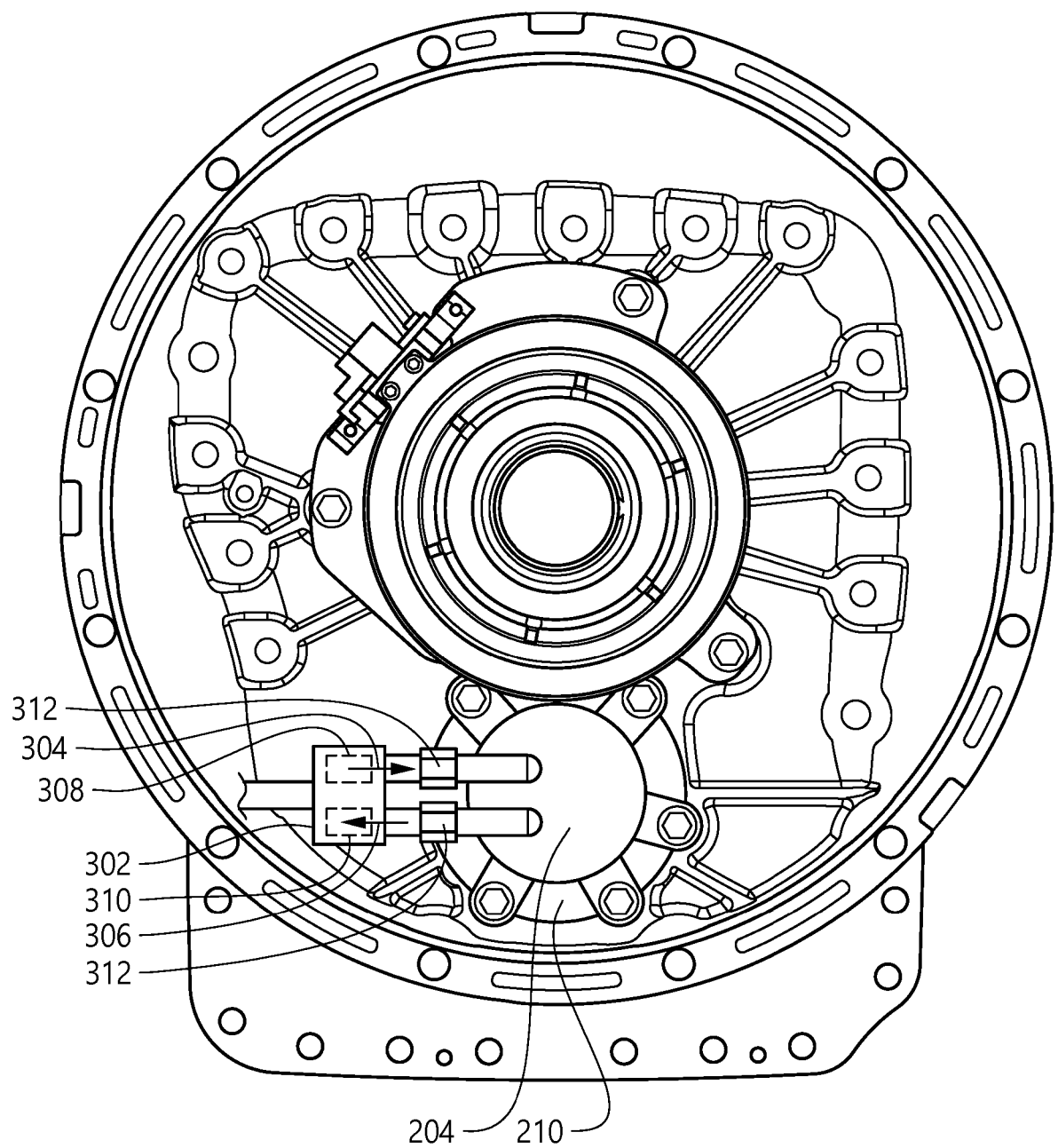
FIG. 4 illustrates the valve unit connected to another actuator arrangement according to an example embodiment.

With reference to FIG. 4 another example embodiment of the valve unit and pneumatically controlled actuator arrangement is illustrated. As can be seen in FIG. 4, the valve unit 302 is mechanically connected to the pneumatically controlled actuator arrangement 210 of the braking mechanism 204, i.e. to the braking actuator arrangement 210. Although FIG. 4 depicts a separate valve unit 302 connected to the braking actuator arrangement 210, the valve unit 302 may equally as well be connected to both of the clutch actuator arrangement 208 and the braking actuator arrangement 210. In such case, respective inlet valves and outlet valves may be arranged for controlling the flow of compressed air to/from either or both of the clutch actuator arrangement 208 and the braking actuator arrangement 210.

The embodiment depicted in FIG. 4 is similar to the embodiment depicted in FIG. 3, i.e. the valve unit 302 comprises an inlet valve 308 and an outlet valve 310, and wherein the valve unit 302 is connected to the braking actuator arrangement 210 at an actuator interface 312 similar to the above description.

Figure 5:
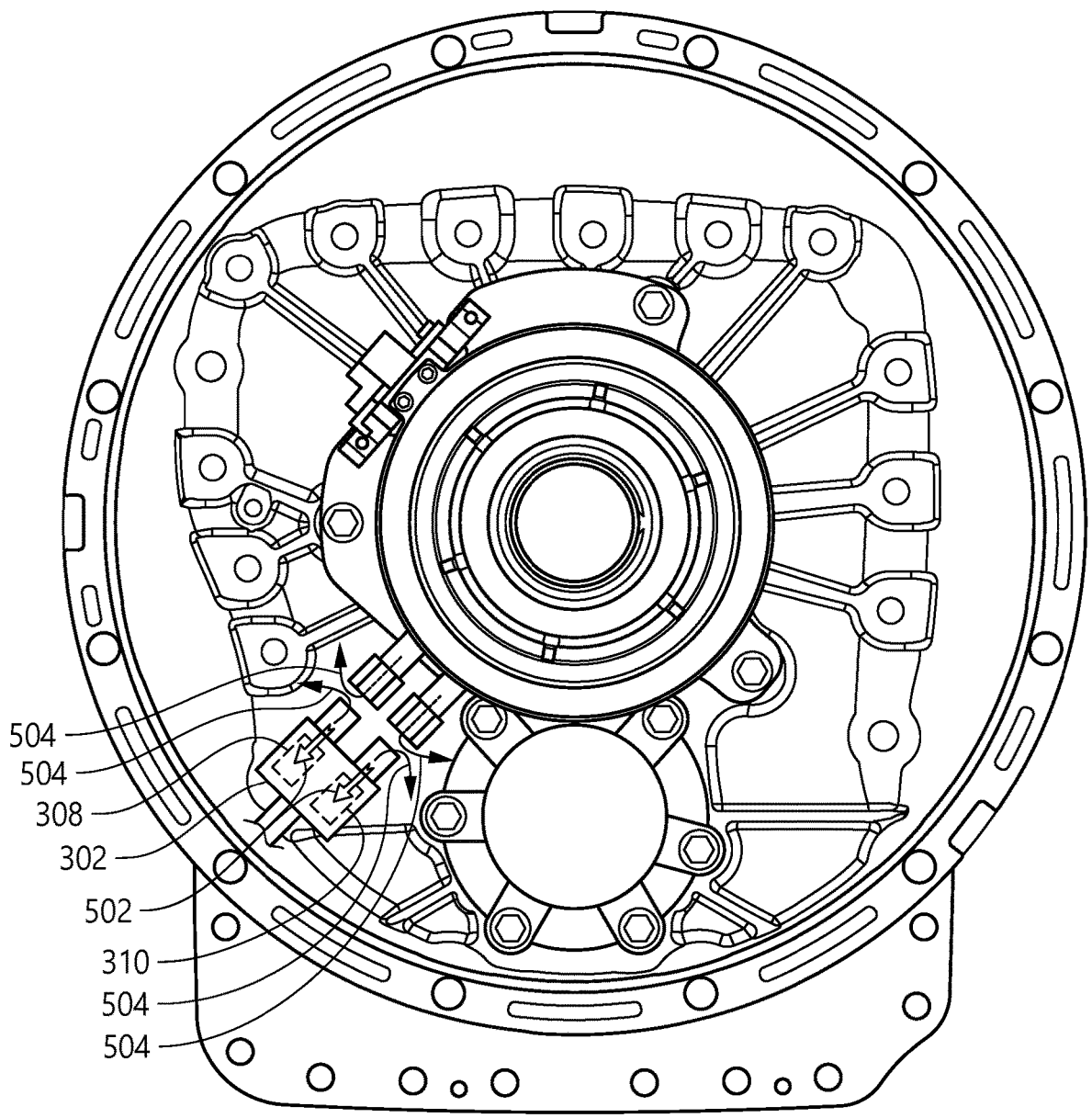
FIG. 5 schematically illustrates the blow off of air when disconnecting the valve unit in FIG. 3 from the pneumatically controlled actuator arrangement.
Figure 6:
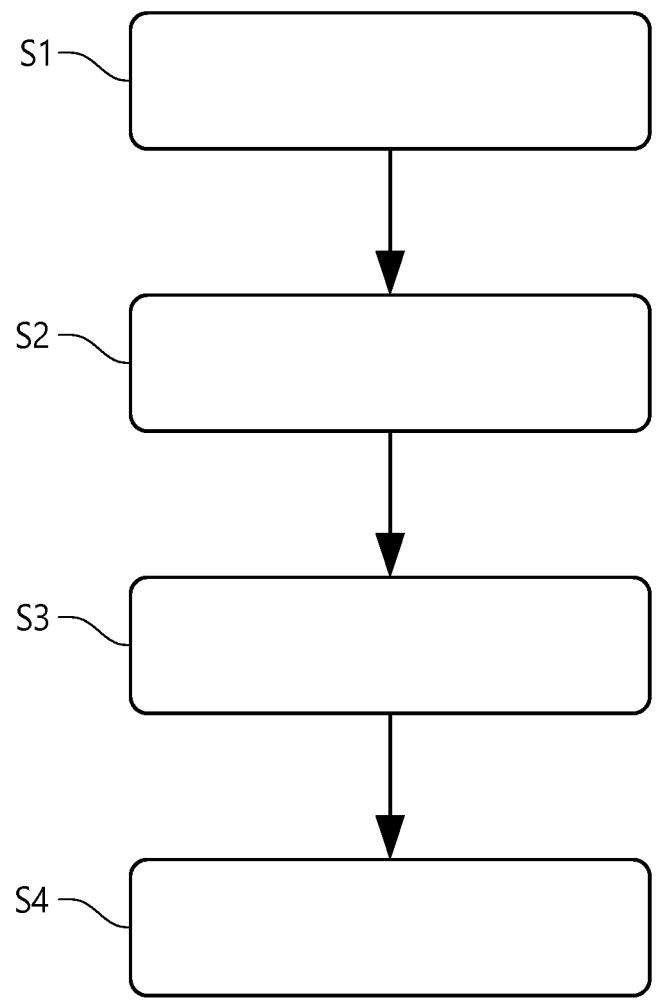
FIG. 6 is a flow chart of a method according to an example embodiment.

Reference is now made to FIGS. 5 and 6 in order to describe the method for disconnecting the valve unit 302 from the pneumatically controlled actuator arrangement 208, 210. FIG. 5 illustrates the disconnection of the valve unit 302 from the pneumatically controlled actuator arrangement of the clutch, i.e. from the clutch actuator arrangement 208. It should however be readily understood that the following method may be equally applicable for disconnecting the valve unit 302 from the braking actuator arrangement 210. It should also be stressed that all of the below described step does not necessarily have to be performed. For example, the step of determining (S2) a pressure level and comparing (S3) the pressure level with a predetermined threshold level may be performed also by means of experience.

Firstly, the valve unit 302 is positioned S1 in an opened state for providing compressed air into the clutch actuator arrangement 208. In detail, the inlet valve 308 is positioned in the opened state while at the same time positioning the outlet valve 310 in the closed state. Hereby, the air pressure level in the clutch actuator arrangement 208 at the interface 312 between the valve unit 302 and the clutch actuator arrangement 208 will increase. An air pressure level in the clutch actuator arrangement 208, preferably in the vicinity of the interface 312 is thus determined S2. The air pressure level is compared S3 to a predetermined threshold level. The step of comparing S3 must not necessarily have to be an active step, the step may equally as well be made based on experience of when in time the pressure level has exceeded the predetermined threshold limit. The predetermined threshold limit may, for example, be the atmospheric gas pressure level, i.e. the pressure level within the clutch housing 206. Preferably, the predetermined threshold limit is substantially higher than the atmospheric gas pressure level.

When the air pressure level has exceeded the predetermined threshold limit, the valve unit 302 is disconnected S4 from the clutch actuator arrangement 208. This can be executed by disconnecting the connecting means that connects the valve unit 302 to the clutch actuator arrangement 208. The valve unit 302 is thus removed from the clutch actuator arrangement 208 in the direction indicated by the arrows with numeral 502.

When disconnecting the valve unit 302 from the clutch actuator arrangement 208, the increased air pressure in the clutch actuator arrangement 208 will force a flow of air in the direction from the interior of the clutch actuator arrangement 208 towards the external environment as depicted with the arrows with numeral 504 in FIG. 5. Accordingly, by providing an increased air pressure in the clutch actuator arrangement 208 before disconnecting the valve unit 302 will create a burst of air that will blow off dust particles from the vicinity of the sealing surfaces when disconnecting the valve unit 302. Hereby, the risk of receiving dust particles during disconnection is reduced significantly.

It is to be understood that the present invention is not limited to the embodiments described above and illustrated in the drawings; rather, the skilled person will recognize that many changes and modifications may be made within the scope of the appended claims.

The invention claimed is:

1. A method for disconnecting a valve unit (302) from a pneumatically controlled actuator arrangement (208, 210) of a vehicle transmission (100), said transmission comprising at least one clutch arrangement (202, 204), a pneumatically controlled actuator arrangement (208, 210) arranged to controllably position the at least one clutch arrangement between a closed position and an opened position, and a valve unit (302) mechanically connected to the pneumatically controlled actuator arrangement (208, 210), wherein the valve unit (302) and the pneumatically controlled actuator arrangement (208, 210) are connected to each other at an actuator interface (312), the method being characterized by the steps of:
    positioning (S1) the valve unit (302) in an opened state for providing compressed air to the pneumatically controlled actuator arrangement (208, 210); and subsequently
    disconnecting (S4), when an air pressure level at a position inside and in the vicinity of the actuator interface (312) exceeds a predetermined threshold limit higher than atmospheric pressure, the valve unit (304) from the pneumatically controlled actuator arrangement (208, 210) at the actuator interface (312) such that a flow of air is forced out from the interior of the clutch actuator arrangement towards an external environment thereof.

2. The method according to claim 1, wherein the valve unit (302) comprises an inlet valve (308) for supply of compressed air to the pneumatically controlled actuator arrangement (208, 210) and an outlet valve (310) for discharge of compressed air from the pneumatically controlled actuator arrangement (208, 210), the method further comprising the steps of:
    positioning (S1) the valve unit in the opened state by positioning the inlet valve (308) in an opened state; and
    positioning the outlet valve (310) in a closed state.

3. The method according to claim 1, wherein the predetermined threshold limit is a pressure level higher than the atmospheric gas pressure level.

4. The method according to claim 1, wherein the pneumatically controlled actuator arrangement (208, 210) comprises a compressed-air cylinder (212, 214) arranged to mechanically position the at least one clutch arrangement (202, 204) between the closed position and the opened position.

5. The method according to claim 1, wherein the clutch arrangement (202, 204) comprises a clutch (202) positioned between a first and a second transmission shaft of the transmission.

6. The method according to claim 5, wherein the clutch (202) is positioned in an opened state for disconnecting the first and second transmission shafts from each other when positioning the valve unit (302) in the opened state.

7. The method according to claim 5, wherein the first transmission shaft is an output shaft of a prime mover and the second transmission shaft is an input shaft of the transmission.

8. The method according to claim 1, wherein the clutch arrangement comprises a braking mechanism (204) arranged between a transmission shaft and a housing (206) of the transmission.

9. The method according to claim 8, wherein the braking mechanism (306) is arranged in a closed state for connecting the transmission shaft to the housing of the transmission when positioning the valve unit in the opened state.

10. A computer program comprising program code means for performing the steps of claim 1 when said program is run on a computer.

11. A computer readable medium carrying a computer program comprising program means for performing the steps of claim 1 when said program means is run on a computer.

12. A control unit configured to control a pneumatically controlled actuator arrangement of a vehicle transmission before disconnecting a valve unit from the pneumatically controlled actuator, the transmission comprising at least one clutch arrangement, wherein the pneumatically controlled actuator arrangement is arranged to controllably position the at least one clutch arrangement between a closed position and an opened position, and wherein the valve unit is mechanically connected to the pneumatically controlled actuator arrangement at an actuator interface (312), wherein the control unit is configured to:

control the valve unit to be positioned in an opened state for providing compressed air to the pneumatically controlled actuator arrangement;

and subsequently determine, when an air pressure level at a position inside and in the vicinity of the actuator interface (312) exceeds a predetermined threshold limit higher than atmospheric pressure, that the valve unit can be disconnected from the pneumatically controlled actuator arrangement such that a flow of air will be forced out from the interior of the clutch actuator arrangement towards an external environment thereof.

13. A vehicle (1) comprising an internal combustion engine, a vehicle transmission and a control unit according to claim 12.

* * * * *